US012801257B2

(12) United States Patent
Osaki et al.

(10) Patent No.: US 12,801,257 B2
(45) Date of Patent: Nov. 17, 2026

(54) HAPTIC ILLUSION SETTING PROGRAM, HAPTIC ILLUSION SETTING DEVICE, HAPTIC ILLUSION SETTING SYSTEM, AND IMAGE GENERATING METHOD

(71) Applicant: Murata Manufacturing Co., Ltd., Kyoto (JP)

(72) Inventors: Koji Osaki, Kyoto (JP); Hiroyuki Ikushima, Kyoto (JP); Masatoshi Miyakawa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 108 days.

(21) Appl. No.: 18/802,032

(22) Filed: Aug. 13, 2024

(65) Prior Publication Data

US 2024/0404151 A1 Dec. 5, 2024

Related U.S. Application Data

(63) Continuation of application No. PCT/JP2023/009589, filed on Mar. 13, 2023.

(30) Foreign Application Priority Data

Mar. 18, 2022 (JP) ................................ 2022-043958

(51) Int. Cl.
*G06F 3/0481* (2022.01)
*G06F 3/01* (2006.01)
(Continued)

(52) U.S. Cl.
CPC ............ *G06F 3/0481* (2013.01); *G06F 3/016* (2013.01); *G06T 3/40* (2013.01); *G06T 11/60* (2013.01); *G06V 10/60* (2022.01)

(58) Field of Classification Search
CPC ........... G06T 11/60; G06T 3/40; G06V 10/60; G06F 3/016
(Continued)

(56) References Cited

U.S. PATENT DOCUMENTS

2016/0098084 A1* 4/2016 Hwang ................ G06F 1/1626 345/173

FOREIGN PATENT DOCUMENTS

JP 2020-067701 A 4/2020
JP 2021-135656 A 9/2021
WO 2009/035100 A1 3/2009

OTHER PUBLICATIONS

Uefuji et al., "A Presenting Method of Virtual Tactile Sense Using a Haptic Device for Kansei Evaluation", Transactions of Japan Society of Kansei Engineering, pp. 89-98, 2008.

(Continued)

*Primary Examiner* — Hai Tao Sun
(74) *Attorney, Agent, or Firm* — McDonald Hopkins LLC

(57) ABSTRACT

A haptic illusion setting program is a program for setting a type of a haptic illusion for a haptic illusion presentation device that presents the haptic illusion that makes a user feel as if the user were touching unevenness by controlling a vibration pattern. The haptic illusion setting program causes a computer to perform an acquiring process and an image generating process. The acquiring process is a process that acquires, as setting parameters for determining the type of the haptic illusion, a coarseness parameter (FIN) representing the coarseness of unevenness and a sharpness parameter (SHA) representing the sharpness of unevenness. The image generating process is a process that generates a reference image (RI) that changes in a manner that depends on the value of each setting parameter.

10 Claims, 7 Drawing Sheets

(51) Int. Cl.
*G06T 3/40* (2024.01)
*G06T 11/60* (2026.01)
*G06V 10/60* (2022.01)

(58) Field of Classification Search
USPC .......................................................... 345/619
See application file for complete search history.

(56) References Cited

OTHER PUBLICATIONS

Yoshimoto et al., “Electrotactile Pulse Rate Modulation to Present Self-Similarity of Object Surface”, Transactions of the Virtual Reality Society of Japan, vol. 16, No. 3, pp. 307-315, 2011.
International Search Report for PCT/JP2023/009589 dated May 16, 2023.

* cited by examiner

HAPTIC ILLUSION SETTING PROGRAM, HAPTIC ILLUSION SETTING DEVICE, HAPTIC ILLUSION SETTING SYSTEM, AND IMAGE GENERATING METHOD

CROSS REFERENCE TO RELATED APPLICATION

This is a continuation of International Application No. PCT/JP2023/009589 filed on Mar. 13, 2023 which claims priority from Japanese Patent Application No. 2022-043958 filed on Mar. 18, 2022. The contents of these applications are incorporated herein by reference in their entireties.

BACKGROUND ART

Technical Field

The present disclosure relates to a haptic illusion setting program, a haptic illusion setting device, a haptic illusion setting system, and an image generating method.

Patent document 1 describes a haptic illusion presentation device. The haptic illusion presentation device presents a predetermined haptic illusion to a user who uses this haptic illusion presentation device by controlling a vibration pattern produced by a vibrating body.

Patent Document 1: Japanese Unexamined Patent Application Publication No. 2020-067701

BRIEF SUMMARY

In haptic illusion presentation devices such as the one described in Patent document 1, the vibration pattern of the vibrating body varies according to a haptic illusion desired to present to a user. Thus, it is conceivable to represent characteristics of haptic illusion using a plurality of parameters. In this case, a desired vibration pattern of a haptic illusion is realized by adjusting the numerical value of each parameter. However, at the time of determining the vibration pattern to realize a desired haptic illusion, from the numerical values of the parameters, it is not easy to comprehend what kind of the haptic illusion will be actualized.

In order to resolve the foregoing issues, one aspect of the present disclosure is a haptic illusion setting program for setting a type of a haptic illusion for a haptic illusion presentation device that presents the haptic illusion to a user by controlling a vibration pattern, the haptic illusion setting program causing a computer to perform an acquiring process that acquires, as setting parameters for determining the type of the haptic illusion, a coarseness parameter representing coarseness of unevenness and a sharpness parameter representing sharpness of unevenness, and an image generating process that generates a reference image that changes in a manner that depends on a change in value of each of the setting parameters.

In order to resolve the foregoing issues, one aspect of the present disclosure is a haptic illusion setting device for setting a type of a haptic illusion for a haptic illusion presentation device that presents the haptic illusion to a user by controlling a vibration pattern, the haptic illusion setting device performing an acquiring process that acquires, as setting parameters for determining the type of the haptic illusion, a coarseness parameter representing coarseness of unevenness and a sharpness parameter representing sharpness of unevenness, and an image generating process that generates a reference image that changes in a manner that depends on a change in value of each of the setting parameters.

In order to resolve the foregoing issues, one aspect of the present disclosure is a haptic illusion setting system including a haptic illusion presentation device that presents a haptic illusion to a user by controlling a vibration pattern and a haptic illusion setting device for setting a type of the haptic illusion for the haptic illusion presentation device, wherein the haptic illusion setting device performs an acquiring process that acquires, as setting parameters for determining the type of the haptic illusion, a coarseness parameter representing coarseness of unevenness and a sharpness parameter representing sharpness of unevenness, and an image generating process that generates a reference image that changes in a manner that depends on a change in value of each of the setting parameters.

In order to resolve the foregoing issues, one aspect of the present disclosure is an image generating method that generates an image to be referenced at a time of setting a type of a haptic illusion for a haptic illusion presentation device that presents the haptic illusion to a user by controlling a vibration pattern, wherein a computer performs an acquiring process that acquires, as setting parameters for determining the type of the haptic illusion, a coarseness parameter representing coarseness of unevenness and a sharpness parameter representing sharpness of unevenness, and an image generating process that generates a reference image in a manner that is based on a change in value of each of the setting parameters.

According to each of the foregoing configurations, it becomes possible to cause the computer to generate the reference image that changes in a manner that depends on a change in value of the setting parameter. Because of this, by visually checking the reference image, a user, who is trying to set a haptic illusion that the haptic illusion presentation device presents, can easily comprehend the haptic illusion that corresponds to each of the setting parameters intuitively.

A haptic illusion desired to set for the haptic illusion presentation device becomes easier to comprehend intuitively.

DETAILED DESCRIPTION

First Embodiment

Hereinafter, a first embodiment of a haptic illusion setting program and a haptic illusion setting device is described with reference to the drawings.

<Haptic Illusion Setting System>

First, an outline of a haptic illusion setting system including a haptic illusion presentation device and a haptic illusion setting device is described.

Figure 1:
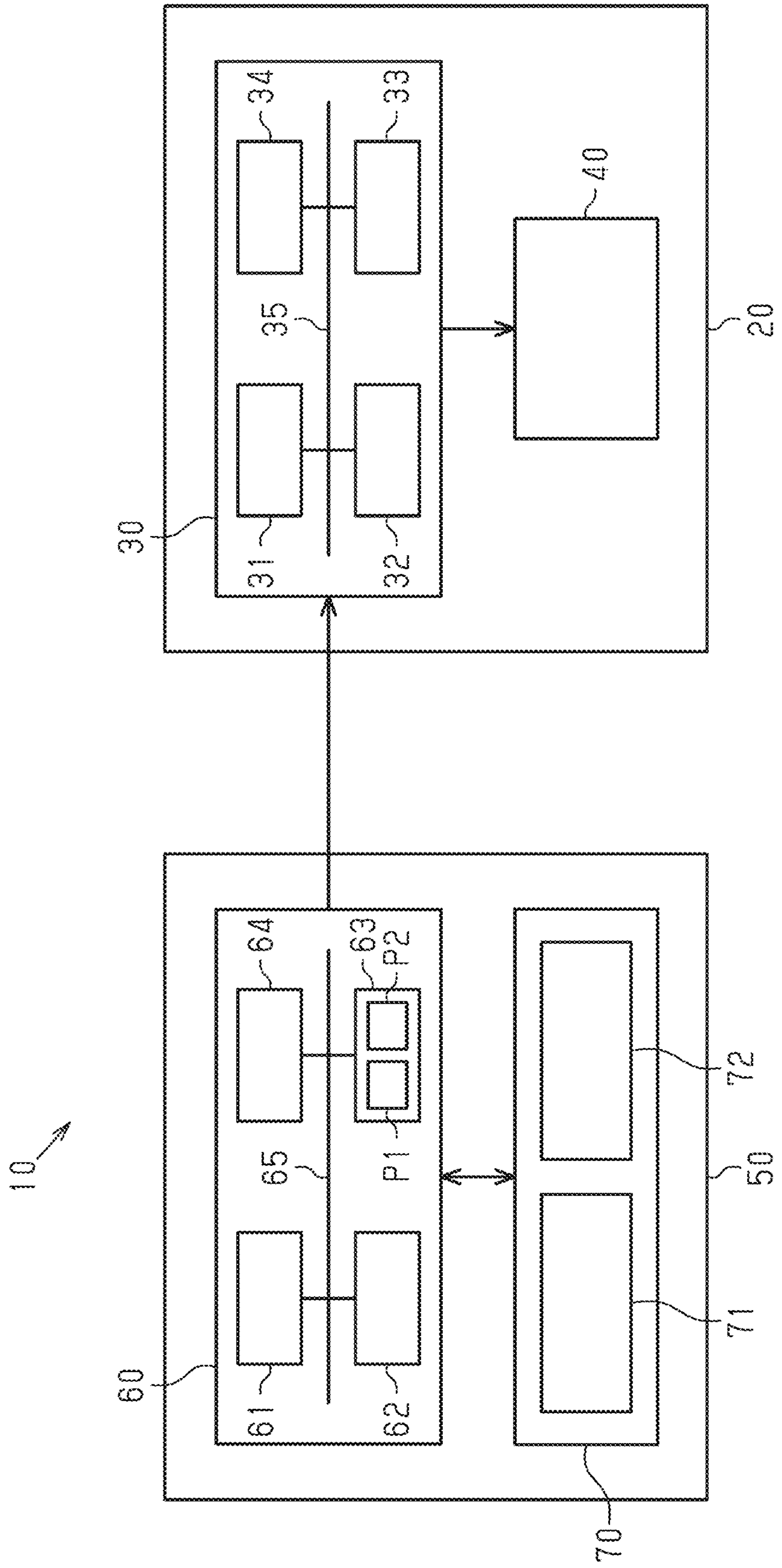
FIG. 1 is a schematic diagram of a haptic illusion setting system of a first embodiment.

As illustrated in FIG. 1, a haptic illusion setting system 10 includes a haptic illusion presentation device 20 and a haptic illusion setting device 50. The haptic illusion presentation device 20 and the haptic illusion setting device 50 can communicate with each other using wired or wireless connection.

The haptic illusion presentation device 20 includes a presentation control device 30 and a vibrating body 40. The presentation control device 30 controls a vibration pattern of the vibrating body 40 to obtain a specific vibration pattern that corresponds to a haptic illusion desired to present. In this way, the haptic illusion presentation device 20 presents a haptic illusion to a user. For example, the haptic illusion presentation device 20 presents a haptic illusion that makes the user feel as if the user were touching unevenness. Note that a haptic illusion is a sense of illusion that makes the brain of a user think as if the user were touching unevenness when a vibration of the vibrating body 40 is presented to the user.

The presentation control device 30 includes a CPU 31, a peripheral circuit 32, a ROM 33, a memory device 34, and a bus 35. The bus 35 connects the CPU 31, the peripheral circuit 32, the ROM 33, and the memory device 34 in such a way that the CPU 31, the peripheral circuit 32, the ROM 33, and the memory device 34 can communicate with each other. The peripheral circuit 32 includes a circuit generating a clock signal that regulates an internal operation, a power supply circuit, a reset circuit, and the like. The ROM 33 pre-stores therein various programs that causes the CPU 31 to perform various controls. The CPU 31 controls the vibrating body 40 by performing the various programs stored in the ROM 33. The memory device 34 stores therein data that determine the vibration pattern of the vibrating body 40. The data stored in the memory device 34 determines the type of a haptic illusion that the haptic illusion presentation device 20 presents.

The vibrating body 40 is installed in the inside of a housing of the haptic illusion presentation device 20 although the illustration thereof is omitted. Further, the vibrating body 40 includes voice coil motors, weights each corresponding to each voice coil motor, and a cubic casing in which these voice coil motors and weights are installed. When a current flows through the coil of the voice coil motor, a force is generated, and this force causes the weight to vibrate. When the weights vibrate, the casing vibrates due to the vibration of the weights. Therefore, by controlling the current that flows through the coil of the voice coil motor, the vibrating body 40 vibrates in the direction along an axis orthogonal to a surface of the casing. More specifically, the vibrating body 40 is, for example, a vibrating body such as the one described in Japanese Unexamined Patent Application Publication No. 2005-190465.

<Haptic Illusion Setting Device>

The haptic illusion setting device 50 that is a computer includes a setting control device 60 and a display 70. The haptic illusion setting device 50 is a device for setting the type of a haptic illusion for the haptic illusion presentation device 20. In other words, the haptic illusion setting device 50 is a device that sets a plurality of setting parameters that determines the vibration pattern of the vibrating body 40 controlled by the haptic illusion presentation device 20.

The display 70 can display an operation screen 71 and a display screen 72. The operation screen 71 includes an image relating to the value of each setting parameter that determines the type of haptic illusion. Note that a user of the haptic illusion setting device 50 can input each setting parameter by operating an input device, which is not illustrated. Further, when the value of each setting parameter is input, that value is reflected on the operation screen 71.

One of the plurality of setting parameters is a coarseness parameter FIN that represents the coarseness of unevenness. The coarseness parameter FIN is a parameter that represents granular coarseness of a surface material of a haptic illusion. As the coarseness of unevenness represented by the coarseness parameter FIN increases, the haptic illusion becomes a haptic illusion as if a user were touching a material having rows of larger grains.

One of the plurality of setting parameters is a sharpness parameter SHA that represents the sharpness of unevenness. The sharpness parameter SHA is a parameter that represents granular sharpness of a surface material of a haptic illusion. As the sharpness of unevenness represented by the sharpness parameter SHA becomes sharper, the haptic illusion becomes a haptic illusion as if a user were touching a material having rows of grains with sharper edges.

One of the plurality of setting parameters is an intensity parameter INT that represents the intensity of haptic illusion. As the intensity of haptic illusion represented by the intensity parameter INT becomes stronger, the haptic illusion becomes a more intense haptic illusion. One of the plurality of setting parameters is a randomness parameter RAN that represents the randomness of the layout, coarseness, and sharpness of unevenness. As the randomness of haptic illusion represented by the randomness parameter RAN becomes stronger, the haptic illusion becomes a more irregular haptic illusion. That is to say, the haptic illusion becomes a haptic illusion in which variation increases depending on the position.

The display screen 72 includes a reference image RI generated by the setting control device 60, which will be described below. As will be described below, the reference image RI is an image that virtually represents a haptic illusion that corresponds to the setting parameters displayed on the operation screen 71 using two-dimensional graphics S.

The setting control device 60 includes a CPU 61, a peripheral circuit 62, a ROM 63, a memory device 64, and a bus 65. The bus 65 connects the CPU 61, the peripheral circuit 62, the ROM 63, and the memory device 64 in such a way that the CPU 61, the peripheral circuit 62, the ROM 63, and the memory device 64 can communicate with each other. The peripheral circuit 62 includes a circuit generating a clock signal that regulates an internal operation, a power supply circuit, a reset circuit, and the like. The ROM 63 stores therein an updating program P1 and a haptic illusion setting program P2. The updating program P1 is a program for updating data that determine the vibration pattern of the vibrating body 40 of the haptic illusion presentation device 20. The haptic illusion setting program P2 is a program for setting the type of a haptic illusion that the haptic illusion presentation device 20 presents. Note that details of the haptic illusion setting program P2 will be described later.

The CPU 61 updates the data that determine the vibration pattern of the vibrating body 40 of the haptic illusion presentation device 20 by performing the updating program P1 stored in the ROM 63. When a user of the haptic illusion setting device 50 performs an operation to reflect each setting parameter in the haptic illusion presentation device 20, the CPU 61 performs the updating program P1. When the CPU 61 starts the updating program P1, the CPU 61 outputs a signal indicating the value of each setting parameter displayed on the operation screen 71 to the presentation control device 30 of the haptic illusion presentation device 20. This allows the CPU 31 of the presentation control device 30 to update the data for determining the vibration pattern of the vibrating body 40, which are stored in the memory device 34.

<Series of Processes Including Acquiring Process and Image Generating Process>

Next, a series of processes including an acquiring process and an image generating process performed by the haptic illusion setting device 50 is described.

The CPU 61 performs a series of processes for setting the type of haptic illusion by performing the haptic illusion setting program P2 stored in the ROM 63. This enables the CPU 61 to perform the acquiring process that acquires each setting parameter that determines the type of haptic illusion and the image generating program that generates a reference image RI that changes in a manner that depends on the value of each setting parameter. That is to say, the CPU 61 realizes an image generating method on the basis of the haptic illusion setting program P2. The CPU 61 repeatedly performs the haptic illusion setting program P2 stored in the ROM 63 at predetermined intervals. That is to say, the haptic illusion setting program P2 is a program that causes the CPU 61 to perform the acquiring process and the image generating process.

Figure 2:
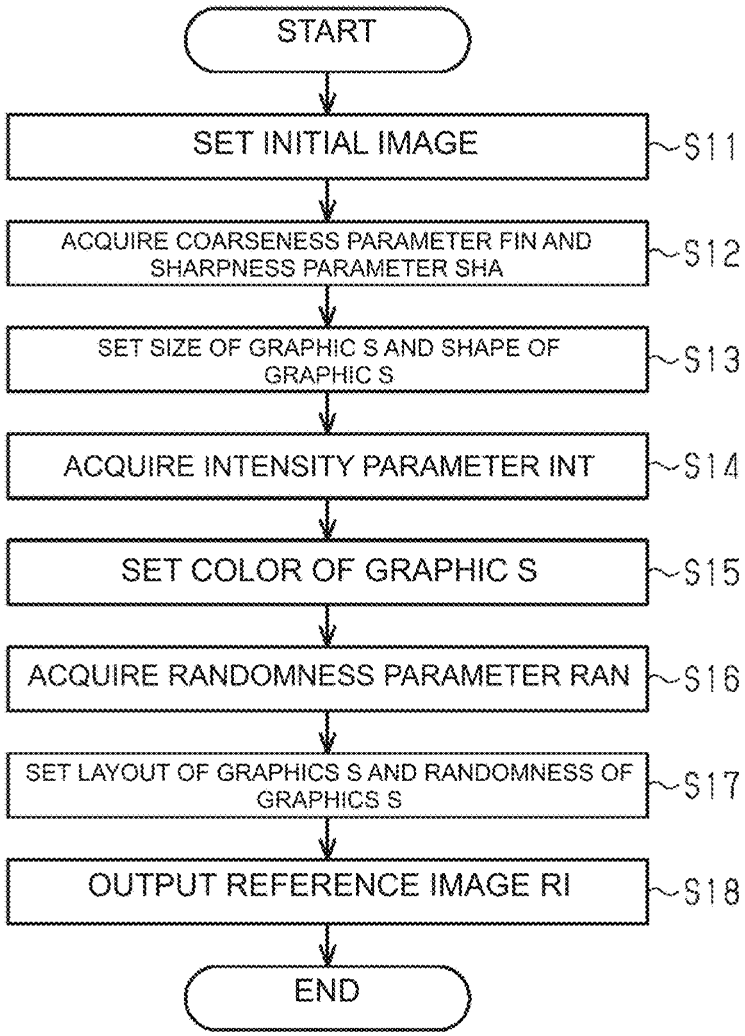
FIG. 2 is a flowchart illustrating a series of processes including an acquiring process and an image generating process of the first embodiment.
Figure 3:
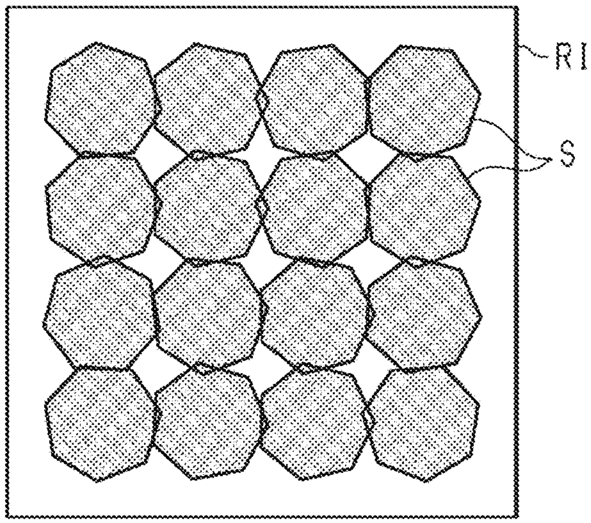
FIG. 3 is a diagram illustrating an initial image of the first embodiment.

As illustrated in FIG. 2, when the CPU 61 starts the haptic illusion setting program P2, first, the CPU 61 performs a process of Step S11. In Step S11, the CPU 61 sets an initial image of the reference image RI. As illustrated in FIG. 3, the initial image is a reference image RI when each setting parameter is assumed to have a predetermined initial value. For example, in an initial image of the example illustrated in FIG. 3, granular graphics S each has a predetermined size and are set in a display range in such a way that the granular shapes S are arranged in four rows and four columns. Further, in the example illustrated in FIG. 3, the graphic S is a regular heptagon. Subsequently, the CPU 61 advances the processes to Step S12.

As illustrated in FIG. 2, in Step S12, the CPU 61 performs a first acquiring process that acquires, as the setting parameters, the coarseness parameter FIN and the sharpness parameter SHA. Specifically, Step S12 is a process in which the CPU 61 acquires the value of the coarseness parameter FIN and the value of the sharpness parameter SHA that are input by a user using the input device. Subsequently, the CPU 61 advances the processes to Step S13.

In Step S13, the CPU 61 performs a first image generating process that generates a reference image RI on the basis of the setting parameters acquired by the first acquiring process. The reference image RI includes two-dimensional graphics S. Further, the first image generating process is a process that changes the shape and size of the granular graphic S from those of the initial image in a manner that depends on the values of the setting parameters.

In the first image generating process, the CPU 61 increases the size of the granular graphic S as the coarseness of unevenness represented by the coarseness parameter FIN increases. That is to say, the first image generating process is a process that increases the size of the granular graphic S as the coarseness of unevenness represented by the coarseness parameter FIN increases.

Specifically, the CPU 61 determines which range, from a first coarseness range to a third coarseness range, the value of the coarseness parameter FIN belongs to. The first coarseness range is a range of the values of the coarseness parameter FIN that indicates small coarseness of unevenness. The third coarseness range is a range of the values of the coarseness parameter FIN that indicates large coarseness of unevenness. The second coarseness range is a range that is greater than the upper limit value of the first coarseness range and is less than the lower limit value of the third coarseness range. As described above, the first coarseness range to the third coarseness range are three ranges obtained by dividing the range across which input of the coarseness parameter FIN is possible.

Figure 4:
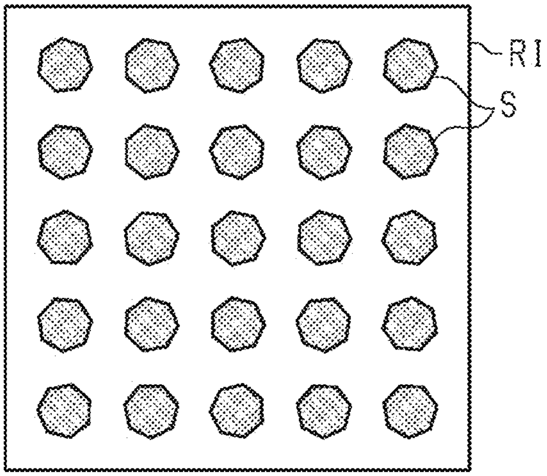
FIG. 4 is a diagram illustrating a reference image in a first coarseness range of the first embodiment.
Figure 5:
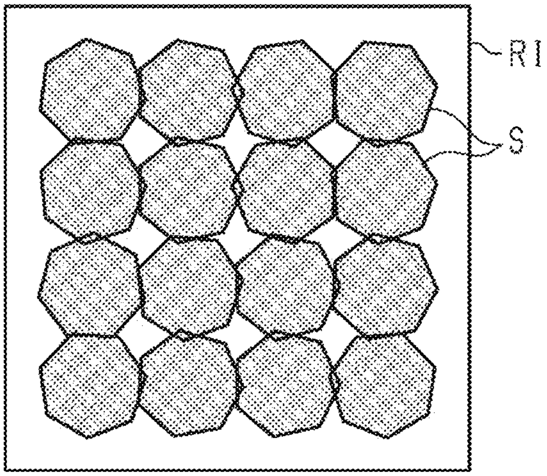
FIG. 5 is a diagram illustrating a reference image in a second coarseness range of the first embodiment.
Figure 6:
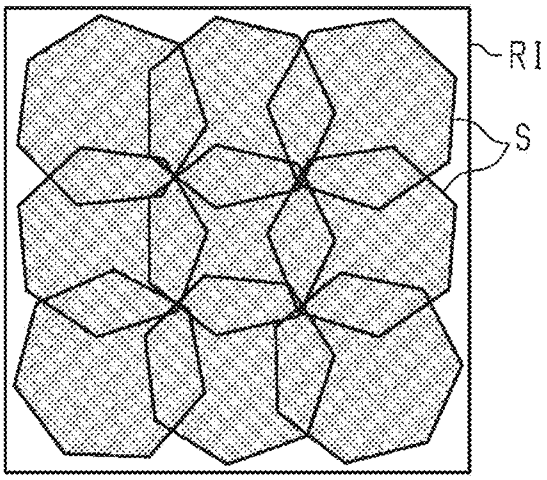
FIG. 6 is a diagram illustrating a reference image in a third coarseness range of the first embodiment.

As illustrated in FIG. 4, in the first image generating process, when the value of the coarseness parameter FIN is in the first coarseness range, the CPU 61 decreases the size of the granular graphic S. As illustrated in FIG. 5, in the first image generating process, when the value of the coarseness parameter FIN is in the second coarseness range, the CPU 61 increases the size of the granular graphic S beyond that of the case where the value of the coarseness parameter FIN is in the first coarseness range. As illustrated in FIG. 6, in the first image generating process, when the value of the coarseness parameter FIN is in the third coarseness range, the CPU 61 increases the size of the granular graphic S beyond that of the case where the value of the coarseness parameter FIN is in the second coarseness range. As described above, in the first image generating process, the CPU 61 increases the size of the granular graphic S in a stepwise manner as the coarseness of unevenness represented by the coarseness parameter FIN acquired by the first acquiring process increases. Note that FIG. 4 to FIG. 6 illustrate the examples in which only the coarseness parameter FIN changes while the sharpness parameter SHA remains constant.

Further, in the first image generating process, the CPU 61 changes the shape of the granular graphic S from that of the initial image in a manner that depends on the sharpness of unevenness represented by the sharpness parameter SHA. The shape of the granular graphic S is a regular N-sided polygon where N is a positive integer equal to or greater than three. Note that in this first image generating process, the shape of the graphic S becomes a circle when N is a sufficiently large integer. That is to say, in the first image generating process, the graphic S is generated as a N-sided polygon or a circle. Furthermore, in the first image generating process, the CPU 61 decreases the value of N as the sharpness of unevenness represented by the sharpness parameter SHA becomes sharper.

Specifically, the CPU 61 determines which range, from a first sharpness range to a third sharpness range, the value of the sharpness parameter SHA belongs to. The first sharpness range is a range of the values of the sharpness parameter SHA that indicate small sharpness of unevenness. The third sharpness range is a range of the values of the sharpness parameter SHA that indicate large sharpness of unevenness. The second sharpness range is a range that is greater than the upper limit value of the first sharpness range and is less than the lower limit value of the third sharpness range. As described above, the first sharpness range to the third sharpness range are three ranges obtained by dividing the range across which input of the sharpness parameter SHA is possible.

Figure 7:
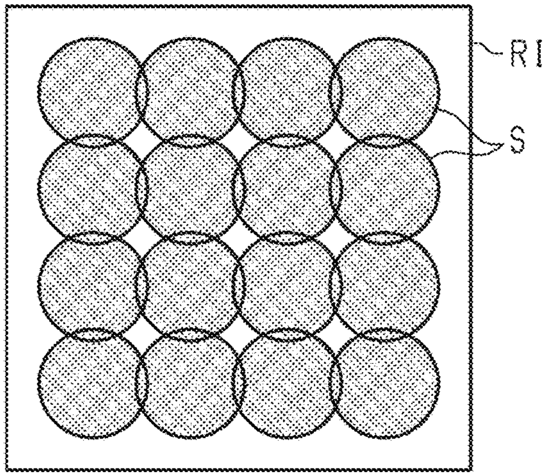
FIG. 7 is a diagram illustrating a reference image in a first sharpness range of the first embodiment.
Figure 8:
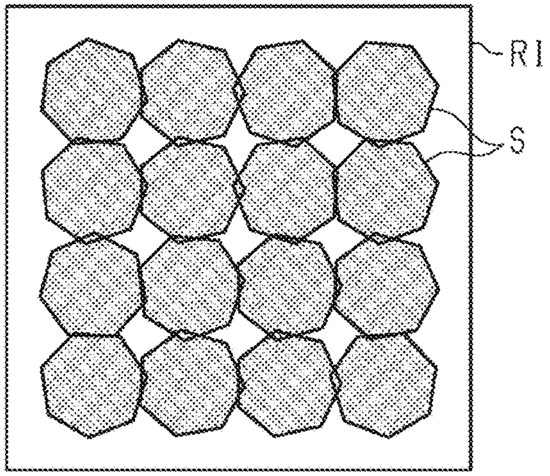
FIG. 8 is a diagram illustrating a reference image in a second sharpness range of the first embodiment.
Figure 9:
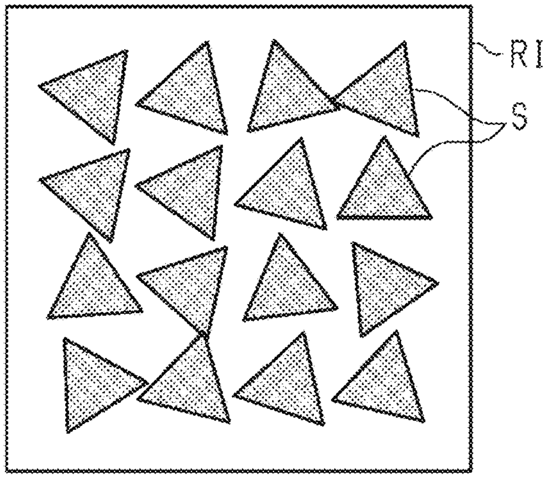
FIG. 9 is a diagram illustrating a reference image in a third sharpness range of the first embodiment.

As illustrated in FIG. 7, in the first image generating process, when the value of the sharpness parameter SHA is in the first sharpness range, the CPU 61 sets the shape of the granular graphic S to a circle. That is to say, the CPU 61 sets the value of N to a sufficiently large integer. As illustrated in FIG. 8, in the first image generating process, when the value of the sharpness parameter SHA is in the second sharpness range, the CPU 61 sets the shape of the granular graphic S to a regular heptagon. That is to say, the CPU 61 sets the value of N to seven. As illustrated in FIG. 9, in the first image generating process, when the value of the sharpness parameter SHA is in the third sharpness range, the CPU 61 sets the shape of the granular graphic S to a triangle. That is to say, the CPU 61 sets the value of N to three. As described above, in the first image generating process, the CPU 61 decreases the value of N in a stepwise manner as the sharpness of unevenness represented by the sharpness parameter SHA acquired by the first acquiring process becomes sharper. Note that FIG. 7 to FIG. 9 illustrate the examples in which only the sharpness parameter SHA changes while the coarseness parameter FIN remains constant. Subsequently, the CPU 61 advances the processes to Step S14.

As illustrated in FIG. 2, in Step S14, the CPU 61 performs a second acquiring process that acquires the intensity parameter INT as the setting parameter. Specifically, Step S14 is a process in which the CPU 61 acquires the value of the intensity parameter INT input by a user using the input device. Subsequently, the CPU 61 advances the processes to Step S15.

In Step S15, the CPU 61 performs a second image generating process that generates a reference image RI on the basis of the intensity parameter INT acquired by the second acquiring process. The second image generating process is a process that changes the color of the granular graphic S in a manner that depends on the value of the intensity parameter INT.

In the second image generating process, the CPU 61 lengthens the wavelength of color of the granular graphic S as the intensity of haptic illusion represented by the intensity parameter INT becomes stronger. That is to say, the second image generating process is a process that lengthens the wavelength of color of the granular graphic S as the intensity of haptic illusion represented by the intensity parameter INT becomes stronger.

Specifically, the CPU 61 determines which range, from a first intensity range to a third intensity range, the value of the intensity parameter INT belongs to. The first intensity range is a range of the values of the intensity parameter INT that indicate weak intensity of haptic illusion. The third intensity range is a range of the values of the intensity parameter INT that indicate strong intensity of haptic illusion. The second intensity range is a range that is greater than the upper limit value of the first intensity range and is less than the lower limit value of the third intensity range. As described above, the first intensity range to the third intensity range are three ranges obtained by dividing the range across which input of the intensity parameter INT is possible.

Figure 10:
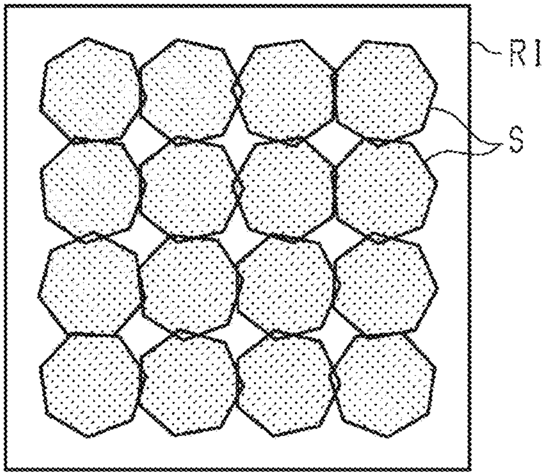
FIG. 10 is a diagram illustrating a reference image in a first intensity range of the first embodiment.
Figure 11:
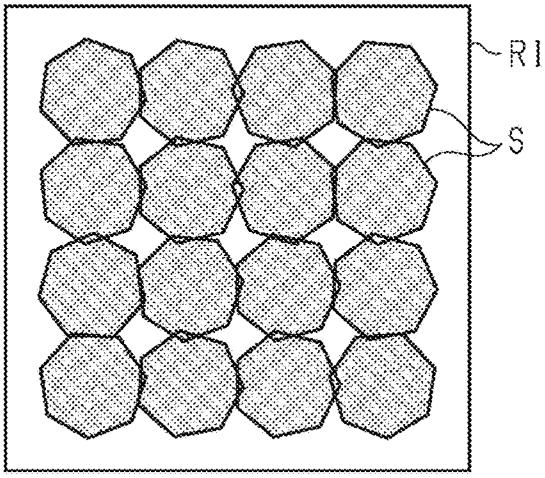
FIG. 11 is a diagram illustrating a reference image in a second intensity range of the first embodiment.
Figure 12:
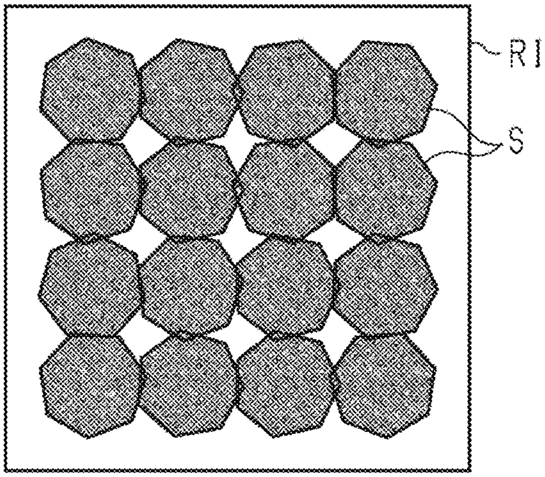
FIG. 12 is a diagram illustrating a reference image in a third intensity range of the first embodiment.

As illustrated in FIG. 10, in the second image generating process, when the value of the intensity parameter INT is in the first intensity range, the CPU 61 sets the color of the granular graphic S to blue. As illustrated in FIG. 11, in the second image generating process, when the value of the intensity parameter INT is in the second intensity range, the CPU 61 sets the color of the granular graphic S to green. As illustrated in FIG. 12, in the second image generating process, when the value of the intensity parameter INT is in the third intensity range, the CPU 61 sets the color of the granular graphic S to red. That is to say, the CPU 61 increases the wavelength of color of the granular graphic S as the intensity of haptic illusion represented by the intensity parameter INT becomes stronger. As described above, in the second image generating process, the CPU 61 changes the color of the granular graphic S in a manner that depends on the intensity of haptic illusion represented by the intensity parameter INT acquired by the second acquiring process. Note that in FIG. 10 to FIG. 12, the difference in the wavelength of the color is represented by the difference in dot pattern. Subsequently, the CPU 61 advances the processes to Step S16.

As illustrated in FIG. 2, in Step S16, the CPU 61 performs a third acquiring process that acquires the randomness parameter RAN as the setting parameter. Specifically, Step S16 is a process in which the CPU 61 acquires the value of the randomness parameter RAN input by a user using the input device. Note that in the present embodiment, the acquiring process including the first acquiring process, the second acquiring process, and the third acquiring process. Subsequently, the CPU 61 advances the processes to Step S17.

In Step S17, the CPU 61 performs a third image generating process that generates a reference image RI on the basis of the randomness parameter RAN acquired by the third acquiring process. The third image generating process is a process that makes the shape and size of the granular graphic S more irregular in a manner that depends on the value of the randomness parameter RAN. Further, the third image generating process is a process that makes the layout of the granular graphics S more random in a manner that depends on the value of the randomness parameter RAN.

In the third image generating process, the CPU 61 changes the layout of the graphics S by setting the distance DE between the geometric centers of adjacent graphics S more irregularly as the randomness of layout of unevenness represented by the randomness parameter RAN increases. In the third image generating process, the distances DE are set irregularly by increasing the standard deviation of the distances DE. With regard to the layout of a plurality of graphics S, it is assumed that the state where the geometric centers of the graphics S are arranged in a matrix form is the most orderly state. In this most orderly state, the distance DE between the adjacent geometric centers is uniform. That is to say, in this case, the standard deviation of the distances DE between the geometric centers of the adjacent graphics S is zero. On the other hand, as the standard deviation of the distances DE increases, the layout of the plurality of graphics S becomes more random. That is to say, as the randomness increases, the CPU 61 changes the layout of the graphics S in such a manner as to increase the standard deviation of the distances DE between the geometric centers of adjacent graphics S.

In the third image generating process, the CPU 61 makes the shape and size of the graphic S more irregular as the randomness of the coarseness and sharpness of unevenness represented by the randomness parameter RAN increases. Here, it is assumed that the size of the graphic S becomes more irregular as the standard deviation of the areas of the graphics S increases. Accordingly, with regard to the size of the graphic S, when the distance from the geometric center of each graphic S to the furthest point thereof is defined as the radius R in calculation, the average value of the radii R becomes equal to the value determined in the first image generating process described above regardless of the randomness parameter RAN. On the other hand, as the randomness of unevenness represented by the randomness parameter RAN increases, the standard deviation of the radii R of the graphics S increases.

Further, it is assumed that the shape of the graphic S becomes more irregular as the standard deviation of the values of N of the graphics S, which are generated as N-sided polygons, increases. Further, in the case where the graphic S is generated as a circle, it is assumed that the value of N is a sufficiently large, predetermined number. With regard to the shape of the graphic S, regardless of the randomness parameter RAN, the average value of the values of N of all the graphics S becomes equal to the value determined in the first image generating process described above. On the other hand, as the randomness of unevenness represented by the randomness parameter RAN increases, the standard deviation of the values of N of the graphics S increases.

Specifically, the CPU 61 determines which range, from a first randomness range to a third randomness range, the value of the randomness parameter RAN belongs to. The first randomness range is a range of the values of the randomness parameter RAN that indicates small randomness of unevenness. The third randomness range is a range of the values of the randomness parameter RAN that indicates large randomness of unevenness. The second randomness range is a range that is greater than the upper limit value of the first randomness range and is less than the lower limit value of the third randomness range. As described above, the first randomness range to the third randomness range are three ranges obtained by dividing the range across which input of the randomness parameter RAN is possible.

Figure 13:
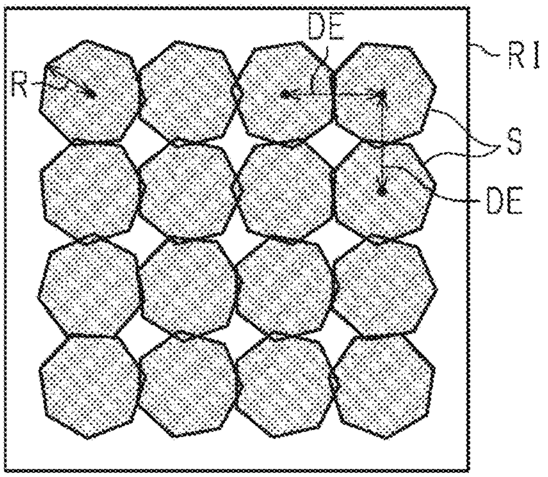
FIG. 13 is a diagram illustrating a reference image in a first randomness range of the first embodiment.

As illustrated in FIG. 13, in the third image generating process, when the value of the randomness parameter RAN is in the first randomness range, the CPU 61 sets the layout of the plurality of graphics S in a correspondingly orderly manner. Specifically, the distance DE between the geometric centers of adjacent graphics S is uniform. Accordingly, the CPU 61 sets the layout in such a way that the geometric centers of the graphics S are arrayed in a matrix form.

Further, in the third image generating process, when the value of the randomness parameter RAN is in the first randomness range, the CPU 61 sets all the shapes of the plurality of graphics S to the same shape. Specifically, the values of N of the graphics S are all set to the same value. In the example illustrated in FIG. 13, the values of N of the graphics S are all seven.

Furthermore, in the third image generating process, when the value of the randomness parameter RAN is in the first randomness range, the CPU 61 sets all the sizes of the plurality of graphics S to the same size. Specifically, the radii R of the graphics S are all set to the same size.

Figure 14:
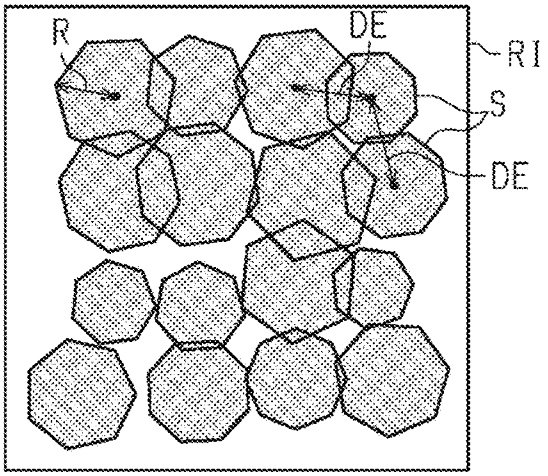
FIG. 14 is a diagram illustrating a reference image in a second randomness range of the first embodiment.

As illustrated in FIG. 14, in the third image generating process, when the value of the randomness parameter RAN is in the second randomness range, the CPU 61 sets the position of the geometric center of each graphic s more randomly than that of the case where the value of the randomness parameter RAN is in the first randomness range. That is to say, when the value of the randomness parameter RAN is in the second randomness range, the CPU 61 sets the layout of the plurality of graphics S more randomly than that of the case where the value of the randomness parameter RAN is in the first randomness range.

Further, in the third image generating process, when the value of the randomness parameter RAN is in the second randomness range, the CPU 61 sets the value of N of each graphic S more irregularly than that of the case where the value of the randomness parameter RAN is in the first randomness range. Specifically, the CPU 61 does not change the average value of the values of N of all the graphics S from that of the case where the randomness parameter RAN is in the first randomness range. Furthermore, the CPU 61 increases the variation from the average value of the values of N of the graphics S beyond that of the case where the randomness parameter RAN is in the first randomness range. That is to say, when the value of the randomness parameter RAN is in the second randomness range, the CPU 61 makes the shapes of the plurality of graphics S more irregular than those of the case where the value of the randomness parameter RAN is in the first randomness range.

Furthermore, in the third image generating process, when the value of the randomness parameter RAN is in the second randomness range, the CPU 61 sets the radius R of each graphic S more irregularly than that of the case where the value of the randomness parameter RAN is in the first randomness range. Specifically, the CPU 61 does not change the average value of the radii R of all the graphics S from that of the case where the randomness parameter RAN is in the first randomness range. Furthermore, the CPU 61 increases the variation from the average value of the radii R of the graphics S beyond that of the case where the randomness parameter RAN is in the first randomness range. That is to say, when the value of the randomness parameter RAN is in the second randomness range, the CPU 61 makes the sizes of the plurality of graphics S more irregular than those of the case where the value of the randomness parameter RAN is in the first randomness range.

Figure 15:
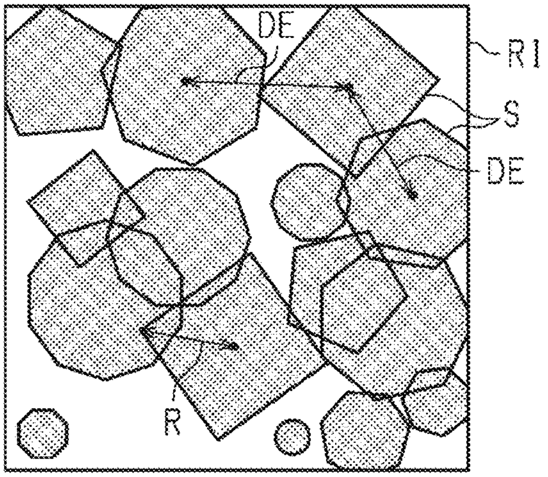
FIG. 15 is a diagram illustrating a reference image in a third randomness range of the first embodiment.

As illustrated in FIG. 15, in the third image generating process, when the value of the randomness parameter RAN is in the third randomness range, the CPU 61 sets the position of the geometric center of each graphic S more randomly than that of the case where the value of the randomness parameter RAN is in the second randomness range. That is to say, when the value of the randomness parameter RAN is in the third randomness range, the CPU 61 sets the layout of the plurality of graphics S more randomly than that of the case where the value of the randomness parameter RAN is in the second randomness range.

Further, in the third image generating process, when the value of the randomness parameter RAN is in the third randomness range, the CPU 61 sets the value of N of each graphic S more irregularly than that of the case where the value of the randomness parameter RAN is in the second randomness range. Specifically, the CPU 61 does not change the average value of the values of N of all the graphics S from that of the case where the randomness parameter RAN is in the second randomness range. Furthermore, the CPU 61 increases the variation from the average value of the values of N of the graphics S beyond that of the case where the randomness parameter RAN is in the second randomness range. That is to say, when the value of the randomness parameter RAN is in the third randomness range, the CPU 61 makes the shapes of the plurality of graphics S more irregular than those of the case where the value of the randomness parameter RAN is in the second randomness range.

Furthermore, in the third image generating process, when the value of the randomness parameter RAN is in the third randomness range, the CPU 61 sets the radius R of each graphic S more irregularly than that of the case where the value of the randomness parameter RAN is in the second randomness range. Specifically, the CPU 61 does not change the average value of the radii R of all the graphics S from that of the case where the randomness parameter RAN is in the second randomness range. Furthermore, the CPU 61 increases the variation from the average value of the radii R of the graphics S beyond that of the case where the randomness parameter RAN is in the second randomness range. That is to say, when the value of the randomness parameter RAN is in the third randomness range, the CPU 61 makes the sizes of the plurality of graphics S more irregular than those of the case where the value of the randomness parameter RAN is in the second randomness range.

As described above, in the third image generating process, the CPU 61 changes the layout of the plurality of graphics S and the shape and size of the graphic S in a manner that depends on the randomness of unevenness represented by the randomness parameter RAN acquired by the third acquiring process. Note that in the present embodiment, the image generating process includes the first image generating process, the second image generating process, and the third image generating process. Subsequently, the CPU 61 advances the processes to Step S18.

As illustrated in FIG. 2, in Step S18, the CPU 61 performs a process that outputs the reference image RI. Specifically, the CPU 61 outputs the reference images RI generated by the first image generating process to the third image generating process to the display screen 72. This causes the reference image RI to be displayed on the display screen 72. Subsequently, the CPU 61 ends the series of processes.

Working of First Embodiment

Suppose that the setting control device 60 does not have the haptic illusion setting program P2. In this case, the following procedure is performed to determine the vibration pattern. First, a user of the haptic illusion setting device 50 inputs each setting parameter by operating the input device. At this time, the display 70 displays the setting parameters input on the operation screen 71. Next, the user of the haptic illusion setting device 50 performs an operation to reflect each setting parameter in the haptic illusion presentation device 20. In response to this, the haptic illusion setting device 50 performs the updating program P1. This allows the presentation control device 30 to update the data for determining the vibration pattern of the vibrating body 40, which are stored in the memory device 34. Next, the user checks a haptic illusion presented by the haptic illusion presentation device 20 by touching the haptic illusion presentation device 20. Furthermore, if the presented haptic illusion is not a desired haptic illusion, the setting parameters are input again. It is necessary to repeat this operation to determine each setting parameter until the desired haptic illusion is obtained.

In the foregoing first embodiment, the CPU 61 generates the reference image RI that changes in a manner that depends on the setting parameters by performing the haptic illusion setting program P2. Further, the CPU 61 displays the generated reference image RI on the display 70 as part of the display screen 72.

Effects of First Embodiment (1-1) According to the first embodiment, at the time of determining each setting parameter, the CPU 61 generates the reference image RI that corresponds to each setting parameter. By visually checking the reference image RI displayed on the display 70, a user can easily comprehend a haptic illusion that corresponds to each setting parameter intuitively. Making easier to comprehend the haptic illusion to be presented as described above leads to shortening of the editing time needed to complete editing of a haptic illusion that the haptic illusion presentation device 20 presents until a desired haptic illusion is obtained.

Further, compared with the case where each setting parameter is determined in the state where the haptic illusion setting program P2 is not included, it becomes possible to visually comprehend a haptic illusion to be presented. For this reason, it becomes easier to share the information with a plurality of persons at the same time. Furthermore, a haptic illusion to be presented can be comprehended even without necessarily presenting the haptic illusion on the haptic illusion presentation device 20.

(1-2) According to the first embodiment, the reference image RI includes two-dimensional graphics S, and in the image generating process, each of the shape, size, color, and layout of the graphic S changes in a manner that depends on the values of the setting parameters. Because of this, by visually checking the graphics S that change in a manner that depends on a plurality of the setting parameters, it becomes more easier to comprehend a haptic illusion to be presented.

(1-3) According to the first embodiment, in the image generating process, the size of the graphic S increases as the coarseness of unevenness represented by the coarseness parameter FIN increases. The coarseness of haptic illusion corresponds to the size of the graphic, and thus a haptic illusion that the haptic illusion presentation device 20 presents becomes more easier to comprehend intuitively.

(1-4) According to the first embodiment, in the image generating process, the graphic S is generated as a regular N-sided polygon, and the value of N decreases as the sharpness of unevenness represented by the sharpness parameter SHA becomes sharper. The sharpness of haptic illusion corresponds to the sharpness of corners of the graphic S, and thus a haptic illusion that the haptic illusion presentation device 20 presents becomes more easier to comprehend intuitively.

(1-5) according to the first embodiment, the acquiring process includes the second acquiring process. That is to say, in the second acquiring process, the CPU 61 acquires, as one of the setting parameters, the intensity parameter INT representing the intensity of haptic illusion. Because of this, it becomes possible to generate the reference image RI reflecting the intensity of haptic illusion.

(1-6) According to the first embodiment, the color of the graphic S changes in a manner that depends on the intensity parameter INT. The intensity of a haptic illusion that the haptic illusion presentation device 20 presents corresponds to the color of the graphic S, and thus a haptic illusion to be presented becomes more easier to comprehend intuitively.

(1-7) According to the first embodiment, the acquiring process includes the third acquiring process. That is to say, in the third acquiring process, the CPU 61 acquires, as one of the setting parameters, the randomness parameter RAN representing the randomness of unevenness. Because of this, it becomes possible to generate the reference image RI reflecting the randomness of unevenness of haptic illusion.

(1-8) According to the first embodiment, the distance DE between the geometric centers of adjacent graphics S becomes more irregular as the randomness of unevenness represented by the randomness parameter RAN increases. The randomness of layout of unevenness in a haptic illusion corresponds to the layout of a plurality of the graphics S, and thus the randomness of unevenness of a haptic illusion that the haptic illusion presentation device 20 presents becomes more easier to comprehend intuitively.

(1-9) According to the first embodiment, the shape and size of the graphic S become more irregular as the randomness of unevenness represented by the randomness parameter RAN increases. The randomness of the coarseness and sharpness of unevenness in a haptic illusion correspond to the irregularities of the shapes and sizes of the graphics S, and thus the randomness of unevenness of a haptic illusion that the haptic illusion presentation device 20 presents becomes more easier to comprehend intuitively.

Second Embodiment

Next, a haptic illusion setting program and a haptic illusion setting device according to the second embodiment are described with reference to the drawings. The second embodiment is different from the first embodiment in the way of inputting to the operation screen 71, the number of the reference images RI displayed on the display screen 72, and the presence or absence of an intermediate image. In the following, features different from those in the first embodiment are mainly described.

<Operation Screen>

Figure 16:
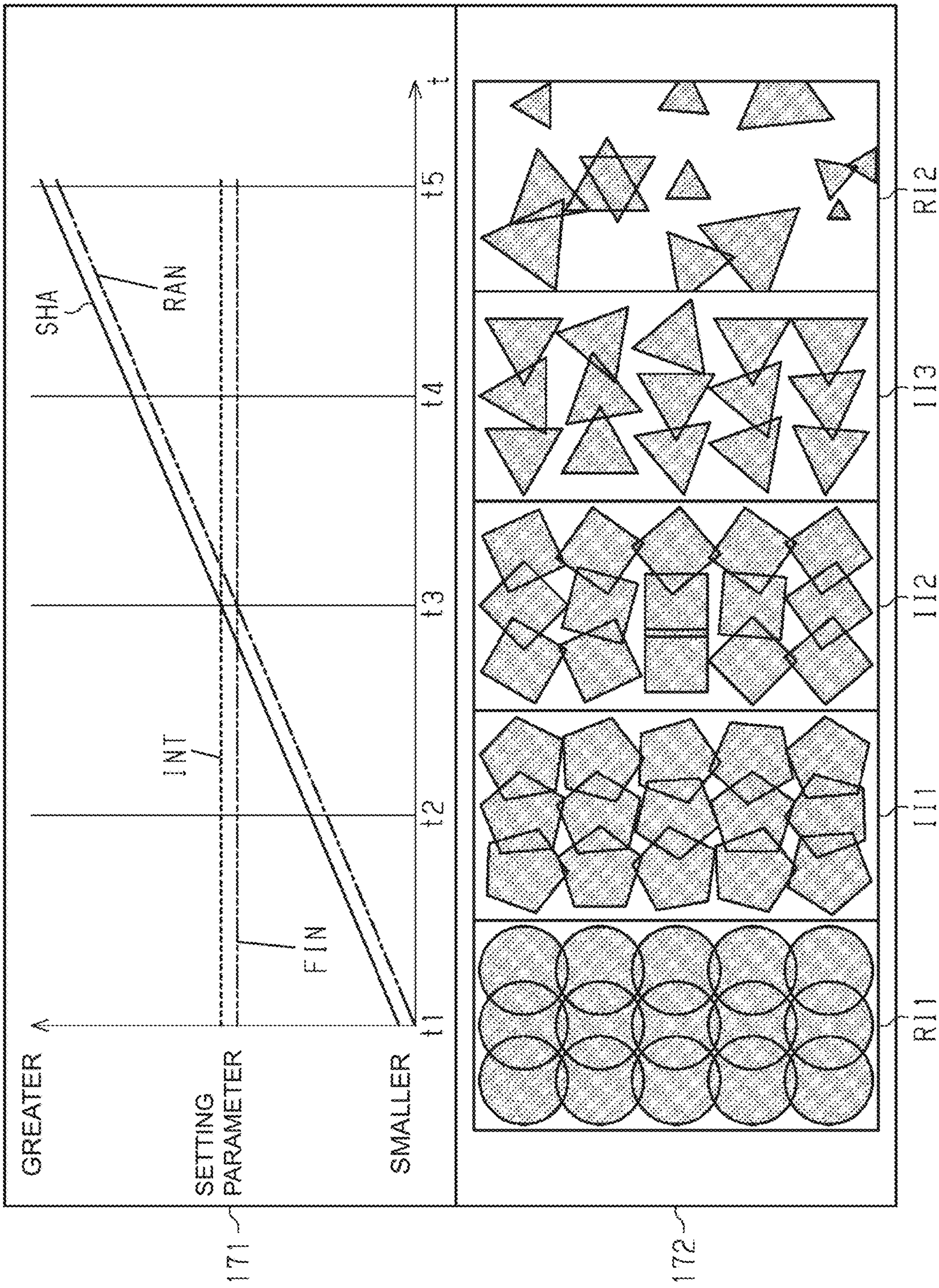
FIG. 16 is a diagram illustrating an operation screen and a display screen of a second embodiment.

As illustrated in FIG. 16, in the second embodiment, an operation screen 171 includes an image relating to a line graph. In this line graph, the value of each setting parameter for determining the type of haptic illusion is displayed as a transition over time. A user of the haptic illusion setting device 50 changes the shape of the line graph by operating a pointing device that is not illustrated. This determines the values of each setting parameter that are indicated by the line graph. That is to say, the haptic illusion setting device 50 acquires the value of each setting parameter through a change in the shape of the line graph.

Note that in FIG. 16, the solid line denotes the sharpness parameter SHA, the dashed line denotes the intensity parameter INT, the dash-double-dot line denotes the coarseness parameter FIN, and the dash-dot line denotes the randomness parameter RAN.

Specifically, on the operation screen 171, the line graph is displayed as a line graph from time t1 to time t5. A user of the haptic illusion setting device 50 determines the value of the setting parameter at one of time t1 to time t5 by operating the pointing device and changing the shape of the line graph. For example, the user determines the values of each setting parameter at time t1 and time t5. Once each setting parameter is determined at time t1 and time t5 as described above, a straight-line graph connecting the value at time t1 and the value at time t5 is generated. Furthermore, the respective values at time t2 to time t4 on the straight-line graph are set as the values of each setting parameter from time t2 to time t4. Here, the values of each setting parameter from the time t2 to the time t4 are values in between the value of the setting parameter at time t1 and the value of the setting parameter at time t5.

Note that the example is described using the case where the user determines each setting parameter at time t1 and time t5. However, the user may alternatively determine the setting parameter at another time t. For example, the user can determine the setting parameter at time t1 and time t4, or can determine the setting parameter at time t2 and time t4. Furthermore, the user can determine the setting parameter at three or more different times t. In these cases, suppose that in between two times t at which the user has determined the setting parameter, there is time t at which the user has not determined the setting parameter. In this case, as is the case with the example described above, a straight-line graph connecting the values of the setting parameter at two times t at which the setting parameter is set is generated. The value of the setting parameter at another time t in this straight-line graph, at which the setting parameter has not been determined, becomes the value of the setting parameter at another time t.

<Acquiring Process and Image Generating Process>

As illustrated in FIG. 16, in the second embodiment, the haptic illusion setting device 50 causes the display 70 to display the display screen 172. This display screen 172 includes five reference images RI. In the following description, suppose that, as an example, a user has determined each setting parameter at time t1 and time t5.

In the acquiring process, the CPU 61 of the setting control device 60 acquires each setting parameter at time t1 as a first setting parameter. Next, as the image generating process, the CPU 61 generates a first reference image RI1 that corresponds to the first setting parameters.

Further, the CPU 61 acquires each setting parameter at time t5 as a second setting parameter. Next, as the image generating process, the CPU 61 generates a second reference image RI2 that corresponds to the second setting parameters.

Furthermore, the CPU 61 acquires each setting parameter at time t2 as a first intermediate parameter. The first intermediate parameter is a value in between the first setting parameter and the second setting parameter. Next, as the image generating process, the CPU 61 generates a first intermediate image II1 that corresponds to the first intermediate parameters.

Furthermore, the CPU 61 acquires each setting parameter at time t3 as a second intermediate parameter. The second intermediate parameter is a value in between the first setting parameter and the second setting parameter. Next, as the image generating process, the CPU 61 generates a second intermediate image II2 that corresponds to the second intermediate parameters.

Furthermore, the CPU 61 acquires each setting parameter at time t4 as a third intermediate parameter. The third intermediate parameter is a value in between the first setting parameter and the second setting parameter. Next, as the image generating process, the CPU 61 generates a third intermediate image II3 that corresponds to the third intermediate parameters.

Furthermore, the CPU 61 outputs these images to the display 70. Particularly, in the present embodiment, the CPU 61 outputs, to the display 70, these images in such a way that the display screen 172 is positioned side by side with the graph of the operation screen 171.

Working of Second Embodiment

In the example illustrated in FIG. 16, suppose that during the period from time t1 to time t5, the value of the sharpness parameter SHA and the value of the randomness parameter RAN increase gradually. Because of this, the sharpness of unevenness represented by the sharpness parameter SHA gradually becomes sharper. Further, the randomness of unevenness represented by the randomness parameter RAN gradually becomes more random. Further, the intensity parameter INT and the coarseness parameter FIN remain constant. In this case, the first intermediate image II1 to the third intermediate image II3 can show how the haptic illusion changes from time t2 to time t4.

Effects of Second Embodiment

According to the foregoing second embodiment, in addition to the effects (1-1) to (1-9) of the first embodiment described above, the following effects are produced.

(2-1) According to the second embodiment, the setting control device 60 generates the first intermediate image II1 to the third intermediate image II3 as intermediate images. Because of this, haptic illusions that correspond to values in between the first setting parameter and the second setting parameter become easier to comprehend.

Other Embodiments

<Haptic Illusion Presentation Device>

The presentation control device 30 may be configured as a circuit (circuitry) including one or more processors that perform various processes in accordance with computer programs (software). Note that the presentation control device 30 may be configured as one or more dedicated hardware circuits such as application specific integrated circuits (ASIC) that perform at least part of the various processes or the like, or may be configured as a circuit that includes a combination of these dedicated hardware circuits. The processor includes a CPU and memory, such as a RAM, a ROM, and the like. The memory stores therein program codes or instructions that are configured in such a manner as to cause the CPU to perform processes. The memory that is a computer readable medium includes all available media that can be accessed by a general-purpose or dedicated computer.

In each of the foregoing embodiments, the configuration of the vibrating body 40 is not limited to the configurations of the foregoing embodiments. For example, the vibrating body 40 may be one that utilizes vibration caused by a motor or one that includes a piezoelectric element.

<Haptic Illusion Setting Device>

The setting control device 60 may be configured as a circuit (circuitry) including one or more processors that perform various processes in accordance with computer programs (software). Note that the setting control device 60 may be configured as one or more dedicated hardware circuits such as application specific integrated circuits (ASIC) that perform at least part of the various processes or the like, or may be configured as a circuit that includes a combination of these dedicated hardware circuits. The processor includes a CPU and memory, such as a RAM, a ROM, and the like. The memory stores therein program codes or instructions that are configured in such a manner as to cause the CPU to perform processes. The memory that is a computer readable medium includes all available media that can be accessed by a general-purpose or dedicated computer.

The setting control device 60 and the display 70 may be connected wirelessly. For example, a server including the setting control device 60 and the display 70 may be configured in such a manner as to be able to communicate with each other via a wireless communication network. In this case, the acquiring process and the image generating process may be performed in the server.

<Acquiring Process>

With regard to the acquiring process, the second acquiring process may be omitted, and the third acquiring process may be omitted. The acquiring process only needs to include at least the first acquiring process. That is to say, in the acquiring process, the intensity parameter INT does not need to be acquired, and the randomness parameter RAN does not need to be acquired. In the acquiring process, as the setting parameters, at least the coarseness parameter FIN and the sharpness parameter SHA need to be acquired.

The acquiring process is divided into plural processes that are the first acquiring process, the second acquiring process, and the third acquiring process. However, the timing of acquiring each setting parameter is not limited to that of the examples of the foregoing embodiments. For example, all the setting parameters may be acquired in a single acquiring process, or the order of the first acquiring process to the third acquiring process may be changed.

The acquiring process is not limited to the process in which the CPU 61 acquires a value that a user inputs on the operation screen 71. For example, the acquiring process may be a process in which the CPU 61 reads setting parameters that are stored in the memory device 64 in advance.

<Image Generating Process>

In the image generating process, the layout does not need to be changed in a manner that depends on the randomness represented by the randomness parameter RAN. Further, in the image generating process, neither one of the shape and size of the graphic S needs to be changed in a manner that depends on the randomness parameter RAN. For example, in the image generating process, one of the shape, size, and color of the graphic S may be made more irregular as the randomness of unevenness represented by the randomness parameter RAN increases. Furthermore, in the image generating process, none of the shape, size, and color of the graphic S needs to be changed in a manner that depends on the randomness parameter RAN.

In the image generating process, the color of the graphic S may be changed in any manner on the basis of the intensity parameter INT. Further, in the image generating process, the color density of the graphic S may be changed in a manner that depends on the intensity parameter INT, or the color of the graphic S does not need to be changed in a manner that depends on the intensity parameter INT.

In the image generating process, in the case where the contour of the graphic S is a wave-like curve, the wave-like curve may be changed to become more sharper in a manner that depends on the sharpness parameter SHA. Further, in a manner that depends on the sharpness parameter SHA, only the reference image RI needs to be changed, and the shape of the graphic S does not need to be changed.

The graphic S in the reference image RI is not necessarily a regular N-sided polygon or a circle. For example, the graphic S may be a non-regular N-sided polygon, such as a non-square rectangle, a rhomboid, a star shape, or the like. Furthermore, the graphic S may be an aggregation of points or lines. Further, in the case with the lines, the lines are not limited to straight lines and may alternatively be crank-like lines that extend while being bent repeatedly or curved lines.

The graphic S in the reference image RI may be three-dimensional. Further, the layout of the plurality of graphics S is arranged two-dimensionally in each of the foregoing embodiments. However, the plurality of graphics S may be arranged three-dimensionally.

The arrangement of the plurality of graphics S in the reference image RI is not necessarily a matrix form in which the graphics S are lined up in directions along which mutually orthogonal axes extend. For example, in the case where two axes cross each other and the graphics S are lined up along each axis, these two axes are not necessarily orthogonal to each other. Further, for example, the graphics S may be lined up along circumferences of a plurality of circles of different diameters.

In each of the foregoing embodiments, the directions to which the plurality of graphics S face are irregular. However, the plurality of graphics S may all face the same direction.

In the image generating process, in a manner that depends on the coarseness parameter FIN, only the reference image RI needs to be changed, and the size of the graphic S does not need to be changed.

In the image generating process, at least one of the shape, size, color, and layout of the graphic S needs to be changed in a manner that depends on the value of any one of the setting parameters. For example, the size of the graphic S may be changed in a manner that depends on the sharpness parameter SHA, or the shape of the graphic S may be changed in a manner that depends on the coarseness parameter FIN. That is to say, in the image generating process, the CPU 61 only needs to change at least one of the shape, size, color, and layout of the graphic S in a manner that depends on the value of the coarseness parameter FIN. Furthermore, the CPU 61 only needs to change at least one of the shape, size, color, and layout of the graphic S in a manner that depends on the value of the sharpness parameter SHA. As described above, as necessary, it may be determined which of the shape, size, color, and layout of the graphic S should be changed and which parameter should be used for the change. Note that one of the shape, size, color, and layout of the graphic S may be changed in a manner that depends on each of two or more of the setting parameters. However, in the case where the graphic S is changed in a manner that depends on each one of a plurality of the setting parameters, it is desirable that a different setting parameter changes a different one of the shape, size, color, and layout of the graphic S.

The reference image RI generated in the image generating process does not need to include the graphic S and may alternatively be an image represented by a plurality of lines. For example, the reference image RI may be an image, such as patterns, contour lines, or the like.

In the second embodiment, the first setting parameter and the second setting parameter are setting parameters at different times t. However, the first setting parameter and the second setting parameter are not limited to these times t. Regardless of time t, it is only necessary to have two setting parameters. Furthermore, an intermediate image that corresponds to a value in between these two setting parameters needs to be generated.

In the first embodiment, the example is described using the case where each setting parameter is divided into three ranges. However, each setting parameter may be divided into two ranges or may be divided into four more ranges. Dividing into a greater number of ranges enables the reference image RI to change as if the change were continuous. Note that in the second embodiment, the sharpness parameter SHA and the randomness parameter RAN are divided into four or more ranges.

<Operation Screen>

In the second embodiment, the operation screen 171 is described using the image relating to the line graph as an example. However, the graph is not limited to a line. For example, the shape of the graph may be an interpolation curve such as a spline or the like.

<Additional Statement>

Technological thoughts that can be derived from the foregoing embodiments and modified examples are described below.

[Additional Statement 1]

A haptic illusion setting program for setting a type of a haptic illusion for a haptic illusion presentation device that presents the haptic illusion to a user by controlling a vibration pattern, the haptic illusion setting program causing a computer to perform an acquiring process that acquires, as setting parameters for determining the type of the haptic illusion, a coarseness parameter representing coarseness of unevenness and a sharpness parameter representing sharpness of unevenness, and an image generating process that generates a reference image that changes in a manner that depends on a change in value of each of the setting parameters.

[Additional Statement 2]

The haptic illusion setting program according to the additional statement 1, wherein the reference image includes a two-dimensional graphic or a three-dimensional graphic, and the image generating process is a process that changes at least one selected from the group consisting of shape, size, color, and layout of the graphic in a manner that depends on the value of the coarseness parameter, and changes at least one selected from the group consisting of shape, size, color, and layout of the graphic in a manner that depends on the value of the sharpness parameter.

[Additional Statement 3]

The haptic illusion setting program according to the additional statement 2, wherein the image generating process is a process that increases the size of the graphic S as the coarseness of unevenness represented by the coarseness parameter increases.

[Additional Statement 4]

The haptic illusion setting program according to the additional statement 2 or the additional statement 3, wherein the image generating process is a process that generates a N-sided polygon or a circle as the graphic and decreases a value of N as the sharpness of unevenness represented by the sharpness parameter becomes sharper, where N is an integer equal to or greater than three.

[Additional Statement 5]

The haptic illusion setting program according to any one of the additional statement 2 to the additional statement 4, wherein the acquiring process includes a process that acquires an intensity parameter representing intensity of the haptic illusion as the setting parameter.

[Additional Statement 6]

The haptic illusion setting program according to the additional statement 5, wherein the image generating process is a process that changes color of the graphic in a manner that depends on the intensity parameter representing the intensity of the haptic illusion.

[Additional Statement 7]

The haptic illusion setting program according to any one of the additional statement 2 to the additional statement 6, wherein the acquiring process includes a process that acquires a randomness parameter representing randomness of unevenness as the setting parameter.

[Additional Statement 8]

The haptic illusion setting program according to the additional statement 7, wherein the reference image includes a plurality of the graphics, and the image generating process is a process that changes the layout of the graphics by increasing standard deviation of distances between geometric centers of adjacent graphics as the randomness of unevenness represented by the randomness parameter increases.

[Additional Statement 9]

The haptic illusion setting program according to the additional statement 7 or the additional statement 8, wherein the reference image includes a plurality of the graphics, and the image generating process is a process that makes at least one selected from the group consisting of shape, size, and color of the graphic more irregular as the randomness of unevenness represented by the randomness parameter increases.

[Additional Statement 10]

The haptic illusion setting program according to any one of the additional statement 1 to the additional statement 9, wherein the acquiring process is a process that acquires a first setting parameter and a second setting parameter as the setting parameters, and the image generating process is a process that generates an intermediate image that corresponds to a value in between the first setting parameter and the second setting parameter.

[Additional Statement 11]

A haptic illusion setting device for setting a type of a haptic illusion for a haptic illusion presentation device that presents the haptic illusion to a user by controlling a vibration pattern, the haptic illusion setting device performing an acquiring process that acquires, as setting parameters for determining the type of the haptic illusion, a coarseness parameter representing coarseness of unevenness and a sharpness parameter representing sharpness of unevenness, and an image generating process that generates a reference image that changes in a manner that depends on a change in value of each of the setting parameters.

[Additional Statement 12]

A haptic illusion setting system comprising:

a haptic illusion presentation device that presents a haptic illusion to a user by controlling a vibration pattern; and a haptic illusion setting device for setting a type of the haptic illusion for the haptic illusion presentation device, wherein the haptic illusion setting device performs an acquiring process that acquires, as setting parameters for determining the type of the haptic illusion, a coarseness parameter representing coarseness of unevenness and a sharpness parameter representing sharpness of unevenness, and an image generating process that generates a reference image that changes in a manner that depends on a change in value of each of the setting parameters.

[Additional Statement 13]

An image generating method that generates an image to be referenced at a time of setting a type of a haptic illusion for a haptic illusion presentation device that presents the haptic illusion to a user by controlling a vibration pattern, wherein a computer performs an acquiring process that acquires, as setting parameters for determining the type of the haptic illusion, a coarseness parameter representing coarseness of unevenness and a sharpness parameter representing sharpness of unevenness, and an image generating process that generates a reference image in a manner that is based on a change in value of each of the setting parameters.

REFERENCE SIGNS LIST

10 Haptic illusion setting system
20 Haptic illusion presentation device
30 Presentation control device
40 Vibrating body
50 Haptic illusion setting device
60 Setting control device
61 CPU
63 ROM
70 Display
71, 171 Operation screen
72, 172 Display screen
DE Distance
FIN Coarseness parameter
INT Intensity parameter
P2 Haptic illusion setting program
RAN Randomness parameter
RI Reference image
S Graphic
SHA Sharpness parameter

The invention claimed is:

1. A haptic illusion setting method for setting a type of a haptic illusion for a haptic illusion presentation device that presents the haptic illusion to a user by controlling a vibration pattern, comprising:

acquiring, as setting parameters for determining the type of the haptic illusion, a coarseness parameter representing coarseness of unevenness of the haptic illusion and a sharpness parameter representing sharpness of unevenness of the haptic illusion, and generating a reference image that changes in a manner that depends on a change in value of each of the setting parameters, wherein the reference image is a two-dimensional graphic or a three-dimensional graphic, wherein generating the reference image comprises changing a shape, a size, a color, or a layout of the graphic in a manner that depends on the value of the coarseness parameter, and changing the shape, the size, the color, or the layout of the graphic in a manner that depends on the value of the sharpness parameter, and wherein generating the reference image comprises generating a N-sided polygon or a circle as the graphic, and decreasing a value of N as the sharpness parameter indicates an increase in sharpness, where N is an integer equal to or greater than three.

2. The haptic illusion setting method according to claim 1, wherein generating the reference image comprises changing the color of the graphic in a manner that depends on an intensity parameter representing the intensity of the haptic illusion.

3. The haptic illusion setting method according to claim 1, wherein acquiring the setting parameters comprises acquiring a randomness parameter representing randomness of unevenness of the haptic illusion as the setting parameter.

4. The haptic illusion setting method according to claim 3,
wherein the reference image comprises a plurality of the graphics, and
wherein generating the reference image comprises changing the layout of the graphics by increasing a standard deviation of distances between geometric centers of adjacent graphics as the randomness parameter indicates an increased randomness of unevenness.

5. The haptic illusion setting method according to claim 3,
wherein the reference image comprises a plurality of the graphics, and
wherein generating the reference image comprises making the shape, the size, or the color of the graphic more irregular as the randomness parameter indicates an increase in randomness of unevenness.

6. A haptic illusion setting method for setting a type of a haptic illusion for a haptic illusion presentation device that presents the haptic illusion to a user by controlling a vibration pattern, comprising:
acquiring, as setting parameters for determining the type of the haptic illusion, a coarseness parameter representing coarseness of unevenness of the haptic illusion and a sharpness parameter representing sharpness of unevenness of the haptic illusion, and generating a reference image that changes in a manner that depends on a change in value of each of the setting parameters,
wherein the reference image is a two-dimensional graphic or a three-dimensional graphic,
wherein generating the reference image comprises changing a shape, a size, a color, or a layout of the graphic in a manner that depends on the value of the coarseness parameter, and changing the shape, the size, the color, or the layout of the graphic in a manner that depends on the value of the sharpness parameter,
wherein acquiring the setting parameters comprises acquiring an intensity parameter representing intensity of the haptic illusion as one of the setting parameters, and
wherein generating the reference image comprises generating a N-sided polygon or a circle as the graphic, and decreasing a value of N as the sharpness parameter indicates an increase in sharpness, where N is an integer equal to or greater than three.

7. The haptic illusion setting method according to claim 6, wherein generating the reference image comprises changing the color of the graphic in a manner that depends on the intensity parameter representing the intensity of the haptic illusion.

8. The haptic illusion setting method according to claim 6, wherein acquiring the setting parameters comprises acquiring a randomness parameter representing randomness of unevenness of the haptic illusion as the setting parameter.

9. The haptic illusion setting method according to claim 8,
wherein the reference image comprises a plurality of the graphics, and
wherein generating the reference image comprises changing the layout of the graphics by increasing a standard deviation of distances between geometric centers of adjacent graphics as the randomness parameter indicates an increased randomness of unevenness.

10. A haptic illusion setting method for setting a type of a haptic illusion for a haptic illusion presentation device that presents the haptic illusion to a user by controlling a vibration pattern, comprising:
acquiring, as setting parameters for determining the type of the haptic illusion, a coarseness parameter representing coarseness of unevenness of the haptic illusion and a sharpness parameter representing sharpness of unevenness of the haptic illusion, and
generating a reference image that changes in a manner that depends on a change in value of each of the setting parameters,
wherein the reference image is a two-dimensional graphic or a three-dimensional graphic, and
wherein generating the reference image comprises changing a shape, a size, a color, or a layout of the graphic in a manner that depends on the value of the coarseness parameter, and changing the shape, the size, the color, or the layout of the graphic in a manner that depends on the value of the sharpness parameter
wherein generating the reference image comprises generating a N-sided polygon or a circle as the graphic, and decreasing a value of N as the sharpness parameter indicates an increase in sharpness, where N is an integer equal to or greater than three,
wherein acquiring the setting parameters comprises acquiring a first setting parameter and a second setting parameter as the setting parameters, and
wherein generating the reference image comprises generating an intermediate image that corresponds to a value between the first setting parameter and the second setting parameter.

* * * * *